United States Patent [19]

Kitamura

[11] Patent Number: 5,284,369
[45] Date of Patent: Feb. 8, 1994

[54] QUICK CONNECTOR

[75] Inventor: Hirokazu Kitamura, Kasugai, Japan

[73] Assignee: Tokai Rubber Industries, Ltd., Komaki, Japan

[21] Appl. No.: 745,849

[22] Filed: Aug. 16, 1991

[30] Foreign Application Priority Data

Aug. 24, 1990 [JP] Japan ................................ 2-223401
Nov. 22, 1990 [JP] Japan ................................ 2-318219

[51] Int. Cl.⁵ ............................................. F16L 35/00
[52] U.S. Cl. ..................... 285/322; 285/316; 285/319; 285/308
[58] Field of Search ............ 285/322, 323, 319, 307, 285/308, 921, 276, 316

[56] References Cited

U.S. PATENT DOCUMENTS

| | | | |
|---|---|---|---|
| 4,026,581 | 5/1977 | Pasbrig . | |
| 4,844,859 | 7/1989 | Coussau | 285/319 |
| 4,893,810 | 1/1990 | Lee | 285/316 |
| 4,904,002 | 2/1990 | Sasa et al. | 285/316 |
| 4,905,964 | 3/1990 | Shiozaki | 285/319 |
| 4,966,398 | 10/1990 | Peterson | 285/316 |
| 5,002,315 | 3/1991 | Bartholomew | 285/319 |
| 5,042,848 | 8/1991 | Shiozaki | 285/323 |
| 5,098,136 | 3/1992 | Washizu | 285/319 |
| 5,100,182 | 3/1992 | Norkey et al. | 285/319 |
| 5,116,086 | 5/1992 | Psajo | 285/316 |
| 5,181,751 | 1/1993 | Kitamura | 285/921 |

FOREIGN PATENT DOCUMENTS

| | | |
|---|---|---|
| 0287791 | 10/1988 | European Pat. Off. . |
| 0317249 | 11/1988 | European Pat. Off. . |
| 0373920 | 6/1990 | European Pat. Off. . |
| 2856064 | 7/1980 | Fed. Rep. of Germany . |
| 1455850 | 2/1965 | France . |
| 1206195 | 11/1987 | Japan . |
| 64-41794 | 3/1989 | Japan . |

Primary Examiner—Eric K. Nicholson
Attorney, Agent, or Firm—Jacobson, Price, Holman & Stern

[57] ABSTRACT

A quick connector includes a male member, a female member, an engager claw member and an urging member. The male member includes an engager at an end. The female member includes a receiver opening, and a inner peripheral surface at least. The engager claw member is disposed relatively movably in an axial direction in the female member, and includes a flange, an engager claw adapted for engaging with the engager of the male member, and a projection adapted for engaging with the inner peripheral surface of the female member at least. The urging member is interposed between the female member and the flange of the engager claw member, and urges the engager claw member outward to the receiver opening of female member. The projection of the engager claw member engages with the inner peripheral surface of the female member, and simultaneously the engager claw of the engager claw member engages with the engager of the male member. Hence, the male member and the female member can be connected quickly and firmly in an axial direction as well as in a radial direction by means of the engager claw member and the urging member.

34 Claims, 11 Drawing Sheets

QUICK CONNECTOR

BACKGROUND OF THE INVENTION

1. Field of the Invention

The present invention relates to a quick connector for piping for connecting hoses or pipes which are employed to transfer a fluid, such as gasoline, oil, water, air and the like.

2. Description of the Prior Art

There has been a connector which is disclosed in Japanese Unexamined Utility Model Publication No. 41794/1989. As illustrated in FIG. 20, the connector comprises a tubular-shaped male member 104 which includes a ring-shaped projection 104a formed at an end on an outer peripheral surface thereof, a tubular-shaped female member 103 including an annular-shaped bulging portion 103a which is formed on an opening end side thereof and which projects radially inward, an engager claw member 106 which is made of a flexible material, which is held by the male member 104 and which is inserted into and engaged with the female member 103, and sealing members 105 and a bushing 107 all of which are disposed in the female member 103 and between the female member 103 and the engager claw member 106. The engager claw member 106 includes a tubular-shaped base 161 in which an annular-shaped groove 161a is formed so as to engage with the ring-shaped projection 104a of the male member 104, and a plurality of legs 162 which extend from the base 161 and which include a concaved groove 162a adapted for engaging with the annular-shaped bulging portion 103a of the female member 103.

In the conventional connector, the male member 104 is first inserted into the engager claw member 106 so as to flex the engager claw member 106 in centrifugal directions, thereby engaging the annular-shaped groove 161a and the ring-shaped projection 104a. Thereafter, the concaved grooves 162a of the engager claw member 106 are flexed radially inward so as to engage with the annular-shaped bulging portion 103a, and at the same time the male member 104 is inserted into the female member 103 together with the engager claw member 106. In this way, the male member 104 can be held in the female member 103 quickly.

However, in the conventional connector, when the male member 104 is pulled in a direction so that it comes out of the female member 103 during service, or when an external force is exerted between the female member 103 and the male member 104 in a direction perpendicular to an axis thereof during service, there arises a fear that the male member 104 may not be held in the female member 103 stably and the reliability of the connector has not been sufficient accordingly, since the male member 104 is held only by the engagement between the annular-shaped groove 161a and the ring-shaped projection 104a and by the engagement between the concaved grooves 162a and the annular-shaped bulging portion 103a. Further, when the pulling force or the external force is large, there arises a fear that even the legs 162 may be deformed heavily.

Moreover, in the conventional connector, there arises a fear that the O-rings 105 and the bushing 107 may be displaced in an axial direction depending on service conditions. If such is the case, the sealing property which results from the O-rings 105 may deteriorate, and it is disadvantageous in view of attaining the pressure resistance. For instance, when a high hydraulic pressure acts on the O-rings 105 in a direction of the arrow "F" of FIG. 20 from an opening 103f side of the female member 103, the high hydraulic pressure acts on the O-rings 105 by way of a fine space "m" between an inner peripheral surface 103g of the female member 103 and an outer peripheral surface 104g of the male member 104 at the front end, thereby displacing the O-rings 105 in the axial direction. Thus, the sealing property and the pressure resistance which result from the O-rings 105 may deteriorate.

Additionally, the high hydraulic pressure applied to the O-rings 105 is further transmitted to the bushing 107 and the engager claw member 106, and accordingly the high hydraulic pressure generates a flexural stress in the engager claw member 106. As a result, the engaging force exerted between the concaved grooves 162a of the engager claw member 106 and the annular-shaped bulging portion 103a of the female member 103 may be weakened, and consequently the connecting force between the male member 104 and the female member 103 may be weakened. In addition, since the high hydraulic pressure applied to the O-rings 105 by way of the fine space "m" is further transmitted to the bushing 107 and the engager claw member 106, a wall surface of the concaved grooves 162a of the engager claw member 106 may be pressed against the annular-shaped bulging portion 103a of the female member 103 heavily and excessively, there is a fear that the wall surface of the concaved grooves 162a may be damaged depending on material qualities of the engager claw member 106. Hence, in the conventional connector, the engaging forces are thus likely to be unstable.

SUMMARY OF THE INVENTION

The present invention has been developed in view of the above-described circumstances. It is therefore an object of the present invention to provide a highly reliable quick connector which enables to quickly connect a male member and a female member thereof and in which the male member and the female member are connected highly firmly. It is another object of the present invention to provide a quick connector in which a ring-shaped sealing member thereof is inhibited from displacing in an axial direction to maintain the favorable sealing property and to enhance the pressure resistance. It is a further object of the present invention to provide a quick connector in which the ring-shaped sealing member is inhibited from displacing in an axial direction, in which a displacement of the ring-shaped sealing member is accordingly inhibited from transmitting to an engager claw member thereof, in which the engager claw member is accordingly inhibited from deforming, in which an engaging force resulting from a claw of the engager claw member is accordingly maintained, and in which the male member and the female member are consequently connected highly firmly.

According to a first aspect of the present invention, there is provided a quick connector, which comprises:

a tubular-shaped male member including an engager formed at an end on an outer peripheral surface thereof, the engager extending therearound in a ring shape;

a tubular-shaped female member including a tubular-shaped socket disposed at an end thereof, the tubular-shaped socket including a receiver opening adapted for receiving the end of the male member therein, a ring-shaped inner peripheral surface formed inward with respect to the receiver opening and having an inside diameter which is larger than an outside diameter of the male member, and a ring-shaped releaser inner peripheral surface formed further inside with respect to the receiver opening and adjacent to the inner peripheral surface and having an inside diameter which is larger than the inside diameter of the inner peripheral surface;

an engager claw member held relatively movably in an axial direction with respect to the socket of the female member, the engager claw member including a flange opposing the receiver opening of the socket, the flange including a central hole which is adapted for disposing the end of the male member therein, an arm projecting from an inner peripheral surface of the flange in an axial direction, a free end of the arm extending to the releaser inner peripheral surface of the socket, an engager claw disposed at the free end of the arm, projecting radially inward and adapted for engaging with the engager of the male member, and a projection projecting from the engager claw radially outward and adapted for engaging with the inner peripheral surface of the socket so as to inhibit the arm from disengaging from the socket in an axial direction and so as to inhibit the arm from deforming in a radial direction; and an urging member interposed between the socket of the female member and the flange of the engager claw member, and urging the engager claw member in a direction in which the engager claw member comes out of the receiver opening of the socket, thereby engaging the projection of the engager claw member with the inner peripheral surface of the socket while engaging the engager claw of the engager claw member with the engager of the male member.

When carrying out piping by using the quick connector according to the first aspect of the present invention, the end of the male member can be relatively inserted into the receiver opening of the socket of the female member by way of the central hole of the flange of the engager claw member. During the insertion, the engager claw member is pressed and moved inward by an assembly worker, and then the engager claw of the engager claw member is pressed by the end of the male member as the male member is inserted, whereby the engager claw member is moved inward against the urging force of the urging member. In the course of the insertion, when the male member is inserted insufficiently, the engager claw of the engager claw member is placed between an outer peripheral surface of the male member and the releaser inner peripheral surface of the socket, and accordingly the urging force of the urging member is maintained while the arm of the engager claw member is deformed radially outward. When the male member is further inserted into the receiver opening of the socket, the engager claw of the engager claw member comes to engage with the engager of the male member accordingly. Hence, the arm is freed from the deformation. When the insertion is terminated at this stage, since the engager claw of the engager claw member engages with the engager of the male member, not only the engager claw member, but the male member as well, are moved by the urging force of the urging member in the direction in which the engager claw member comes out of the receiver opening of the socket. Then, the projection of the engager claw member engages with the inner peripheral surface of the socket, thereby inhibiting the arm of the engager claw member from disengaging from the socket in the axial direction and inhibiting the arm from deforming in a radial direction. In this way, the male member and the female member are connected by way of the engager claw member in the axial direction and in the radial direction. Therefore, the male member and the female member can be connected quickly, and the reliability of the connection between the male member and the female member can be improved.

The socket of the female member can include a truncated cone-shaped tapered surface which reduces an outside diameter thereof as it approaches an end of the receiver opening. The urging member can include a letter "C"-shaped ring spring which exerts a spring force in a radial direction and a plurality of fasteners which are disposed in a circumferential direction of the ring spring, which reduce inside diameters thereof as they approach the female member, and which include tapered surfaces agreeing with the truncated cone-shaped tapered surface of the socket of the female member.

The socket of the female member can further include a seating surface. The urging member can be a coil spring which is interposed between the flange of the engager claw member and the seating surface of the socket of the female member in a compressed manner and which is disposed coaxially with the female member substantially. The flange of the engager claw member can further include a ring-shaped projection which covers an outer peripheral surface of an end of the coil spring.

The urging member can be a press-fitted member which is to be press-fitted between the flange of the engager claw member and the female member. Further, the press-fitted member can include a substantially letter "C"-shaped inserted portion, and an operator knob which extends from the inserted portion integrally therewith and which is adapted for operating with finger tips or the like.

The male member can further include a ring-shaped projection which is disposed at a rear thereof with respect to the engager, which can contact with the flange of the engager claw member, and which is adapted for controlling an insertion of the male member into the female member when the ring-shaped projection contacts with the flange.

The engager of the male member can be a ring-shaped concaved engager which is adapted for engaging with the engager claw of the engager claw member, or the engager of the male member can be a ring-shaped convexed engager which is adapted for engaging with the engager claw of the engager claw member.

Moreover, the male member can further include a truncated cone-shaped guide at a leading end thereof, the truncated cone-shaped guide which reduces an outside diameter thereof as it approaches the leading end thereof and which can contact with the engager claw of the engager claw member and lift up the engager claw radially outward while the male member is inserted.

In addition, in the quick connector according to the first aspect of the present invention, the urging member can be obviated and the projection of the engager claw member can be press-fitted into a space which is defined by the inner peripheral surface of the female member. Such a construction will be described later with reference to a Fifth Preferred Embodiment illustrated in FIG. 30.

According to a second aspect of the present invention, there is provided a quick connector comprises another female member, which includes:

a tubular-shaped first socket, the first socket including a receiver opening which is adapted for disposing an inserted end and the engager of the male member therein, a first inner peripheral surface which is adapted for surrounding the engager of the male member and a ring-shaped first holding surface which is disposed on an opposite side with respect to the receiver opening;

a tubular-shaped second socket detachably connected to the first socket, the second socket including a ring-shaped second holding surface which is disposed on an end side of the second socket so as to oppose the first holding surface of the first socket, a ring-shaped sealing inner peripheral surface which is disposed adjacent to the second holding surface and coaxially therewith and which has an inside diameter larger than an outside diameter of the inserted end of the male member, a second inner peripheral surface which is adapted for surrounding a leading end of the inserted end of the male member, and a ring-shaped sealing member which is disposed coaxially with the sealing inner peripheral surface and which is adapted for sealing between an outer peripheral surface of the inserted end of the male member and the sealing inner peripheral surface; and a stopper held between the first holding surface of the first socket and the second holding surface of the second socket, the stopper including a central hole which is adapted for disposing the inserted end of the male member therein and a ring-shaped regulatory surface which opposes the ring-shaped sealing member and which is adapted for inhibiting the ring-shaped sealing member from displacing in an axial direction.

In the quick connector according to the second aspect of the present invention, the first socket and the second socket of the female member are connected while the ring-shaped sealing member is engaged with the sealing inner peripheral surface of the second socket of the female member. As a result, the stopper is held and fixed between the first holding surface of the first socket and the second holding surface of the second socket. Under the circumstances, since the ring-shaped sealing member opposes the surface of the stopper, the ring-shaped sealing member is inhibited from displacing in an axial direction by the surface of the stopper. Hence, the axial displacement of the ring-shaped sealing member can be suppressed during the service of the quick connector, the sealing property resulting from the ring-shaped sealing member can be maintained favorably, and consequently the pressure resistance can be improved.

Further, in the quick connector according to the second aspect of the present invention, the ring-shaped sealing member is inhibited from displacing in the axial direction by the surface of the stopper even when a fluidic pressure is applied to the ring-shaped sealing member by way of a fine space between the second inner peripheral surface of the second socket and an outer peripheral surface of the inserted end of the male member. Namely, the fluidic pressure which acts on the ring-shaped sealing member can be inhibited from transmitting to the engager claw member. Accordingly, the deformations of the engager claw member which have been caused by the transmission of the fluidic pressure can be inhibited from occurring. Therefore, the engagement between the claw of the engager claw member and the engager of the male member can be inhibited from deteriorating.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure;

FIGS. 1 through 11 relate to a quick connector of a First Preferred Embodiment according to the present invention, wherein:

FIG. 1 is a fragmentary longitudinal cross sectional view which illustrates a connection process of the quick connector;

FIG. 2 is a fragmentary longitudinal cross sectional view which illustrates another connection process of the quick connector;

FIG. 3 is a front view of an urging member of the quick connector whose diameter is enlarged;

FIG. 4 is a fragmentary longitudinal cross sectional view which illustrates another connection process of the quick connector;

FIG. 5 is a fragmentary longitudinal cross sectional view which illustrates another connection process of the quick connector;

FIG. 6 is a front view of a socket of the quick connector;

FIG. 7 is a fragmentary longitudinal cross sectional view of the socket;

FIG. 8 is a front view of an engager claw member of the quick connector;

FIG. 9 is a fragmentary longitudinal cross sectional view of the engager claw member;

FIG. 10 is another front view of the urging member of the quick connector; and

FIG. 11 is a fragmentary longitudinal cross sectional view of the urging member;

FIGS. 12 through 15 relate to a quick connector of a Second Preferred Embodiment according to the present invention, wherein:

FIG. 12 is a fragmentary longitudinal cross sectional view which illustrates a connection process of the quick connector;

FIG. 13 is a fragmentary longitudinal cross sectional view which illustrates another connection process of the quick connector;

FIG. 14 is a fragmentary longitudinal cross sectional view which illustrates another connection process of the quick connector; and FIG. 15 is a fragmentary longitudinal cross sectional view which illustrates another connection process of the quick connector;

FIGS. 16 through 19 relate to a quick connector of a Third Preferred Embodiment according to the present invention, wherein:

FIG. 16 is a fragmentary longitudinal cross sectional view which illustrates a connection process of the quick connector;

FIG. 17 is a fragmentary longitudinal cross sectional view which illustrates another connection process of the quick connector;

FIG. 18 is a fragmentary longitudinal cross sectional view which illustrates another connection process of the quick connector; and FIG. 19 is a fragmentary longitudinal cross sectional view which illustrates another connection process of the quick connector;

FIGS. 21 through 29 relate to a quick connector of a Fourth Preferred Embodiment according to the present invention, wherein:

FIG. 21 is a fragmentary longitudinal cross sectional view which illustrates a connection process of a male member and a female member of the quick connector;

FIG. 22 is a fragmentary longitudinal cross sectional view which illustrates another connection process of the male member and the female member;

FIG. 23 is a fragmentary longitudinal cross sectional view which illustrates another connection process of the male member and the female member;

FIG. 24 is a fragmentary longitudinal cross sectional view which illustrates another connection process of the male member and the female member;

FIG. 25 is a fragmentary longitudinal cross sectional view of a second socket of the female member whose upper half is illustrated in cross section;

FIG. 26 is a fragmentary longitudinal cross sectional view of a first socket of the female member whose upper half is illustrated in cross section;

FIG. 27 is a longitudinal cross sectional view of an engager claw member of the quick connector;

FIG. 28 is a front view of the engager claw member; and

FIG. 29 is a fragmentary longitudinal cross sectional view of the first socket whose upper half is illustrated in enlarged cross section;

FIGS. 31 and 32 relate to a quick connector of a Sixth Preferred Embodiment according to the present invention, wherein:

FIG. 31 is a fragmentary longitudinal cross sectional view of the quick connector in which a male member and a female member is connected and whose upper half is illustrated in cross section; and FIG. 32 is a front view of a press-fitted member of the quick connector; and FIGS. 33 and 34 relate to a quick connector of a Seventh Preferred Embodiment according to the present invention, wherein:

FIG. 33 is a fragmentary longitudinal cross sectional view of the quick connector in which a male member and a female member is connected and whose upper half is illustrated in cross section; and FIG. 34 is a fragmentary longitudinal cross sectional view of the quick connector in which the connection is under way and whose upper half is illustrated in cross section.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

First Preferred Embodiment

Figure 1:
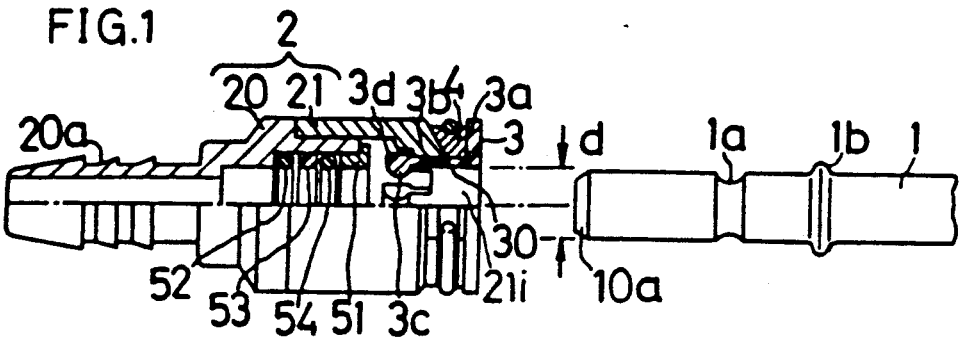

As illustrated in FIG. 1, the quick connector of the First Preferred Embodiment comprises a tubular-shaped male member 1, a tubular-shaped female member 2, an engager claw member 3, an urging member 4 interposed between a socket 21 of the female member 2 and the engager claw member 3, and a regulatory member 51, an O-ring 52, a collar 53 and an O-ring 54 all of which are held in the female member 2.

The male member 1 includes a ring-shaped concave 1a which is formed on an outer peripheral surface thereof by a predetermined distance away from an end end to another end and which works as the engager, a ring-shaped projection 1b which is formed on an outer peripheral surface thereof by a predetermined distance away from the concave 1a further to another end, and a guide 10a which is formed in a truncated cone shape at a leading end thereof.

The female member 2 includes a second socket 20 on which a sawtooth-shaped sealing portion 20a is formed at an end thereof, and the first socket 21 which is fixed at another end of the second socket 20. The sawtooth-shaped sealing portion 20a of the second socket 20 is adapted for connecting a hose or the like.

In the second socket 20, one of the constituent parts of the female member 2, the member 51 is disposed adjacent to the boundary between the second socket 20 and the first socket 21. The member 51 has an inside diameter "d" which is substantially equal to an outside diameter "d" of the male member. Further, the O-ring 52, the collar 53 and the O-ring 54 are held between the member 51 and the second socket 20.

Figure 6:
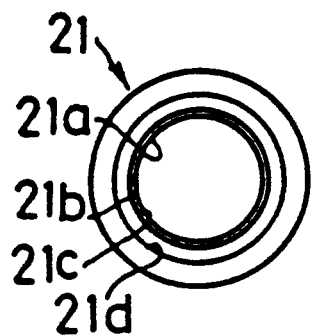
Figure 7:
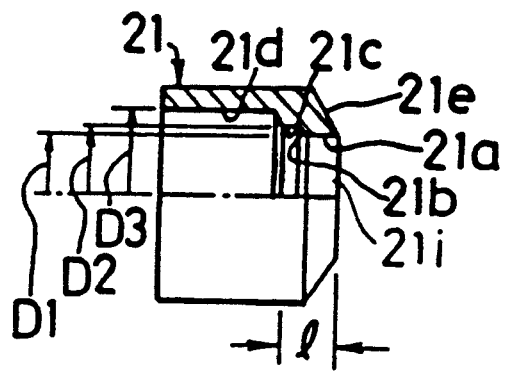

As illustrated in FIGS. 6 and 7, the first socket 21 of the female member 2 includes a ring-shaped guide surface 21a, a ring-shaped first inner peripheral surface 21b, a ring-shaped second inner peripheral surface 21c, and a ring-shaped releaser inner peripheral surface 21d. The ring-shaped guide surface 21a is formed inward with respect to a receiver opening 21i, which is adapted for receiving the leading end of the male member 1, and parallel in an axial direction thereto, and it has an inside diameter "D1" larger than the outside diameter "d" of the male member. The ring-shaped first inner peripheral surface 21b is formed adjacent to the guide surface 21a, and it has an inside diameter which enlarges more than the inside diameter "D1" of the guide surface 21a as it extends inward. The ring-shaped second inner peripheral surface 21c is formed adjacent to, inward with respect to and parallel in an axial direction to the first inner peripheral surface 21b, and it has an inside diameter "D2" larger than the inside diameter "D1" of the guide surface 21a. The ring-shaped releaser inner peripheral surface 21d is formed together with a stepped portion, it is disposed adjacent to, inward with respect to and parallel in an axial direction to the second inner peripheral surface 21c, and it has an inside diameter "D3" larger than the inside diameter "D2" of the second inner peripheral surface 21c. Further, the first socket 21 includes a tapered surface 21e, which reduces a diameter thereof as it approaches the receiver opening 21i, at another end thereof.

Figure 8:
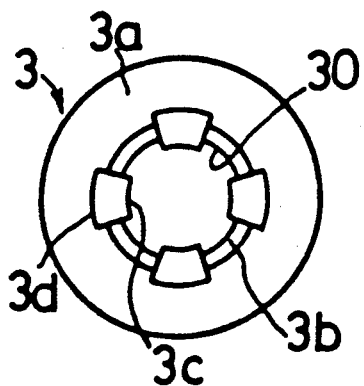
Figure 9:
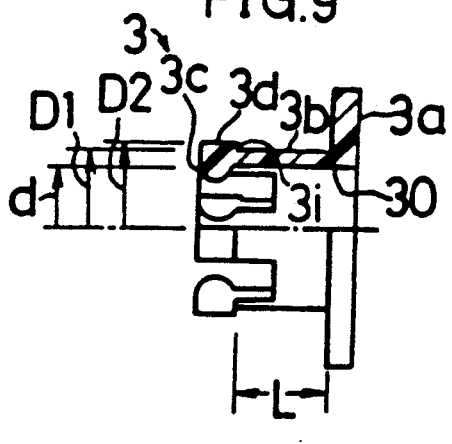

As illustrated in FIGS. 8 and 9, the engager claw member 3 includes a flange 3a, four arms 3b, engager claws 3c, and projections 3d. The flange 3a includes a central hole 30 which is adapted for disposing the leading end of the male member 1 therein. The arms 3b project from an inner peripheral surface of the flange 3a parallel in an axial direction thereof, and free ends thereof extend to the releaser inner peripheral surface 21d of the first socket 21. The engager claws 3c project radially inward at the free ends of the arms 3b, and engage with the ring-shaped concave 1a of the male member 1. The projections 3d project radially outward at the free ends of the arms 3, and include surfaces which are parallel to an axial direction thereof.

The engager claw member 3 is designed as follows: The inside diameters of the central hole 30 and the arms 3b are substantially equal to the outside diameter "d" of the male member 1. The outside diameters of the arms 3b are substantially equal to the inside diameter "D1" of the guide surface 21a of the first socket 21. The outside diameters of the projections 3d are substantially equal to the inside diameter "D2" of the second inner peripheral surface 21c of the first socket 21. The difference between the outside diameters of the projections 3d and the inside diameters of the engager claws 3c is smaller than the difference between the inside diameter "D3" of the releaser inner peripheral surface 21d of the first socket 21 and the outside diameter "d" of the male member 1 (i.e., the difference, "D3−d"), and it is larger than the difference between the inside diameter "D2" of the second inner peripheral surface 21c of the first socket 21 and the outside diameter "d" of the male member 1 (i.e., the difference, "D2"−d"). Further, the lengths of the arms 3b are "L" which is slightly larger than the length "l" from the receiver opening 21i end of the guide surface 21a and to the inward end of the second inner peripheral surface 21c. As illustrated in FIG. 1, the engager claw member 3 thusly constructed is disposed in the female member 2 so that the flange 3a opposes the receiver opening 21i of the first socket 21 of the female member 2, and so that the arms 3b, the engager claws 3c and the projections 3d can move in an axial direction thereof when they are disposed in the receiver opening 21i of the first socket 21.

Figure 10:
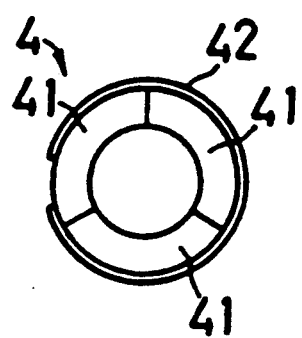
Figure 11:
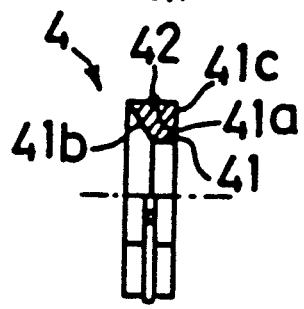

As illustrated in FIGS. 10 and 11, the urging member 4 includes three sector-shaped fasteners 41 which have a central angle of 120° and which includes a ring-shaped groove 41a formed in an outer peripheral surface thereof, and a ring spring 42 which is seated on and held in the ring-shaped groove 41a of the fasteners 41 and which is adapted for urging the fasteners 41 radially inward. The fasteners 41 include a tapered surface 41b which is formed at an end and which agrees with the tapered surface 21e of the first socket 21 of the female member 2, and a vertical surface 41c which is disposed at another end perpendicularly to an axial direction thereof and which agrees with the flange 3a of the engager claw member 3. As illustrated in FIG. 1, the urging member 4 is interposed between the first socket 21 of the female member 2 and the flange 3a of the engager claw member 3, so as to urge the engager claw member 3 outward to the receiver opening 21i of the first socket 21.

Figure 2:
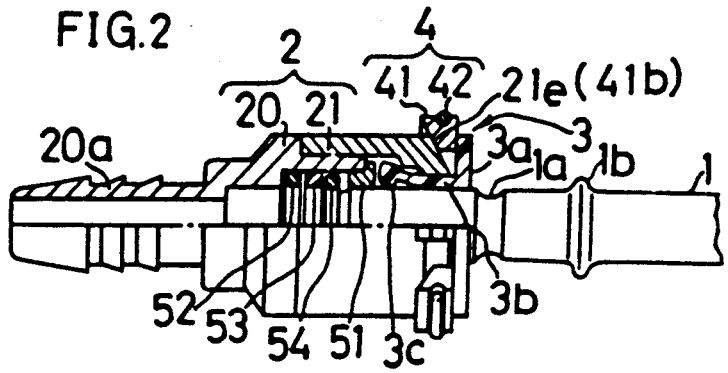
Figure 3:
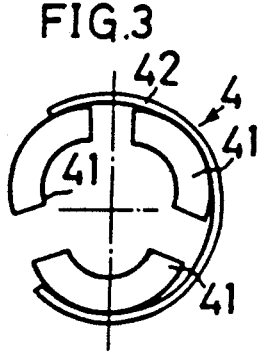

When carrying out piping by using the quick connector, the leading end of the male member 1 can be relatively inserted into the receiver opening 21i of the first socket 21 of the female member 2 by way of the central hole 30 of the flange 3a of the engager claw member 3. During the insertion, as illustrated in FIG. 2, an assembly worker presses the engager claw member 3 inward, or he presses the engager claws 3c of the engager claw member 3 with the leading end of the male member 1, and accordingly the engager claw member 3 is moved inward as the male member 1 is inserted. When the engager claw member 3 is moved inward, since the tapered surface 41b of the fasteners 41 of the urging member 4 are moved along the tapered surface 21e of the first socket 21, the fasteners 41 of the urging member 4 enlarge the diameter of the ring spring 42 as illustrated in FIG. 3. The engager claw member 3 is moved until the engager claws 3c are brought into contact with the member 51 and the flange 3a is brought into contact with the receiver opening 21i end of the first socket 21 simultaneously. Thus, further movement of the engager claw member 3 is inhibited, thereby inhibiting the engager claw member 3 from being damaged and inhibiting the urging member 4 from coming off.

Figure 4:
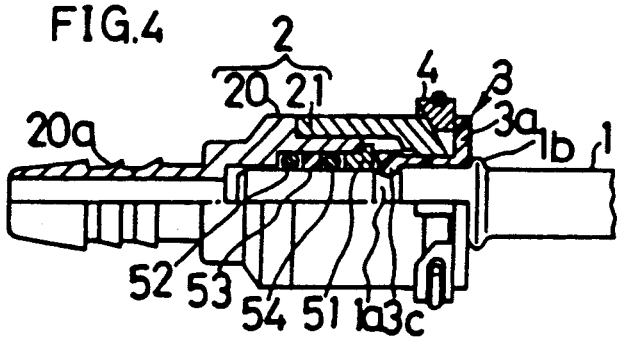

In the course of the above-described insertion, when the male member 1 is inserted insufficiently, the engager claws 3c of the engager claw member 3 are placed between an outer peripheral surface of the male member 1 and the releaser inner peripheral surface 21d of the first socket 21, and accordingly the engager claws 3c are urged radially outward by the outer peripheral surface of the male member 1. At this moment, as illustrated in FIGS. 6 and 7, since the first socket 21 includes the first and second inner peripheral surfaces 21b and 21c between the guide surface 21a and the releaser inner peripheral surface 21d, the arms 3 flex radially outward gently. Accordingly, the arms 3b are inhibited from being damaged. Also at this moment, as illustrated in FIG. 3, since the ring spring 42 of the urging member 4 is enlarged radially, the urging member 4 swells out of the first socket 21. Accordingly, the urging member 4 tells the assembly worker that the insertion is carried out insufficiently. Thereafter, the male member 1 is further inserted into the receiver opening 21i of the first socket 21, and accordingly, as illustrated in FIG. 4, the engager claws 3c of the engager claw member 3 come to engage with the ring-shaped concave 1a of the male member 1. At this moment, since the ring-shaped projection 1b of the male member 1 is brought into contact with the rear surface of flange 3a of the engager claw member 3, no excessive insertion is carried out.

Figure 5:
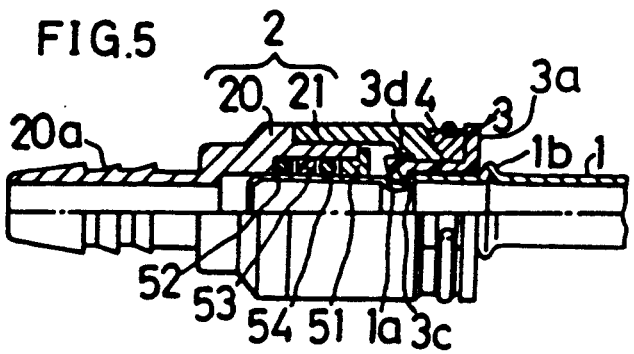

When the assembly worker terminates the insertion under the above-described circumstances, since the engager claws 3c of the engager claw member 3 are engaged with the ring-shaped concave 1a by the urging force of the urging member 4 as illustrated in FIG. 5 and since the ring-shaped projection 1b is brought into contact with the rear surface of flange 3a, the engager claw member 3 is moved outward to the receiver opening 21i of the first socket 21 together with the male member 1. However, since the outside diameters of the projections 3d are substantially identical with the inside diameter "D2" of the second inner peripheral surface 21c, the surfaces 3i of the projections 3d are brought into contact with the first inner peripheral surface 21b, the surfaces 3i which are disposed perpendicularly to an axial direction as illustrated in FIG. 9. At the same time, the radially-disposed surfaces of the projections 3d are brought into contact with the second inner peripheral surface 21c. Consequently, the engager claw member 3 is terminated to move outward. As a result, the arms 3b are inhibited from disengaging from the first socket 21 in an axial direction, and simultaneously they are inhibited from deforming in a radial direction. At this moment, since no urging force is exerted, the urging member 4 recovers its original shape as illustrated in FIG. 10. Accordingly, the urging member 4 tells the assembly worker that the insertion is carried out adequately.

Through the quick connector thusly assembled in a piping system, a fluid is transferred by way of the tubular-shaped male member 1 and the tubular-shaped female member 2. During the service, the engager claws 3 are engaged with the ring-shaped concave 1a and the projections 3d are brought into contact with and inhibited from moving in an axial direction as well as in a radial direction by the first and second inner peripheral surfaces 21b and 21c. Hence, when the male member 1 is pulled so as to come out of the male member 2, or when an external force is applied to the male member 1 and the female member 2 in a direction being perpendicular to an axial direction, the male member 1 is held stably in the female member 2 against the pulling force or the external force. Thus, the male member 1 and the female member 2 are connected firmly. Therefore, the quick connector not only enables to carry out piping quickly, but also gives a high reliability to a piping system.

Second Preferred Embodiment

Figure 12:
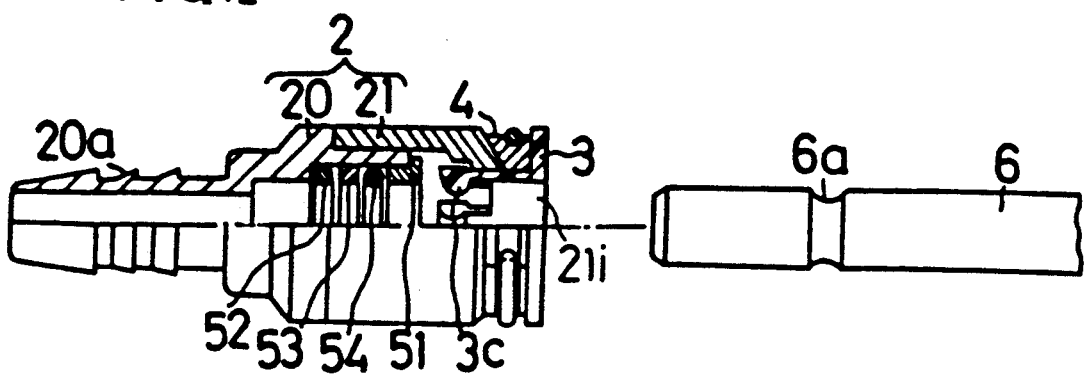

The quick connector of the Second Preferred Embodiment is basically identical with that of the First Preferred Embodiment. However, as illustrated in FIG. 12, the quick connector employs a male member 6 which is free from the ring-shaped projection 1b of the First Preferred Embodiment.

Figure 13:
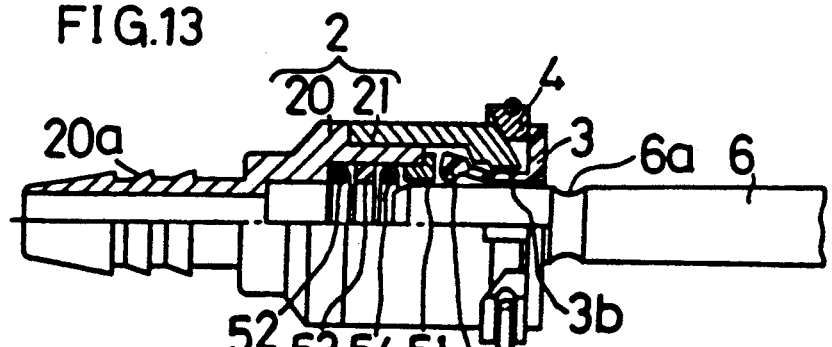

When carrying out piping by using the quick connector, the leading end of the male member 6 can be relatively inserted into the receiver opening 21i of the first socket 21 of the female member 2 in a manner similar to the quick connector of the First Preferred Embodiment. During the insertion, as illustrated in FIG. 13, the engager claw member 3 is moved inward as the male member 6 is inserted. In the course of the insertion, when the male member 6 is inserted insufficiently, the urging member 4 swells out of the first socket 21 radially outward. Accordingly, the urging member 4 tells the assembly worker that the insertion is carried out insufficiently.

Figure 14:
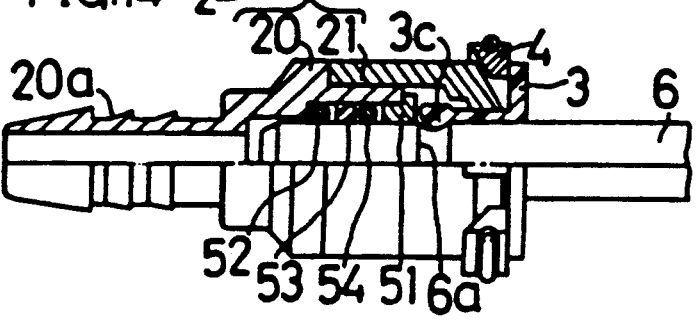
Figure 15:
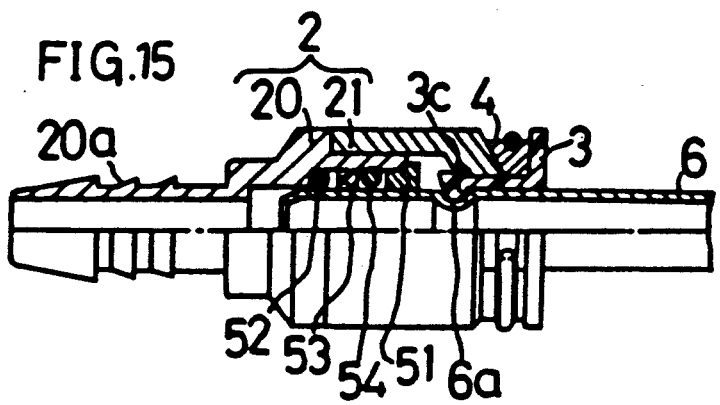

Thereafter, the male member 6 is further inserted into the receiver opening 21i of the first socket 21, and accordingly, as illustrated in FIG. 14, the engager claws 3c of the engager claw member 3 come to engage with the ring-shaped concave 6a of the male member 6. At this moment, since the male member 6 is free from the the ring-shaped projection 1b, it is necessary for the assembly worker to pay attention to whether the insertion is completed properly. When the assembly worker terminates the insertion under the circumstances, since the engager claws 3c of the engager claw member 3 are engaged with the ring-shaped concave 6a by the urging force of the urging member 4 as illustrated in FIG. 15, the engager claw member 3 is moved outward to the receiver opening 21i of the first socket 21 together with the male member 6.

Through the quick connector thusly assembled in a piping system, a fluid is transferred by way of the tubular-shaped male member 6 and the tubular-shaped female member 2. The quick connector of the Second Preferred Embodiment operates and effects advantages similarly to the quick connector of the First Preferred Embodiment, and the operation and advantages will not be described herein accordingly.

Third Preferred Embodiment

Figure 16:
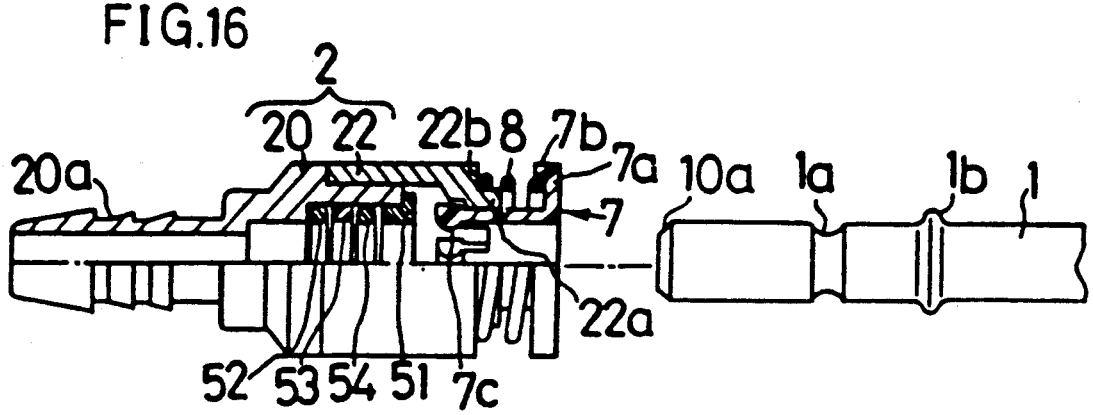

The quick connector of the Third Preferred Embodiment is basically identical with that of the First Preferred Embodiment. However, as illustrated in FIG. 16, the quick connector employs a first socket 22, an engager claw member 7, and an urging member 8. The engager claw member 7 includes a ring-shaped projection 7b which projects from an inner peripheral surface of a flange 7a in an axial direction. The urging member 8 is a ring-shaped coil spring which is held by a projection 22a and a seating surface 22b of the first socket 22 at an end thereof and which is held by the projection 7b and the flange 7a at another end thereof.

Figure 17:
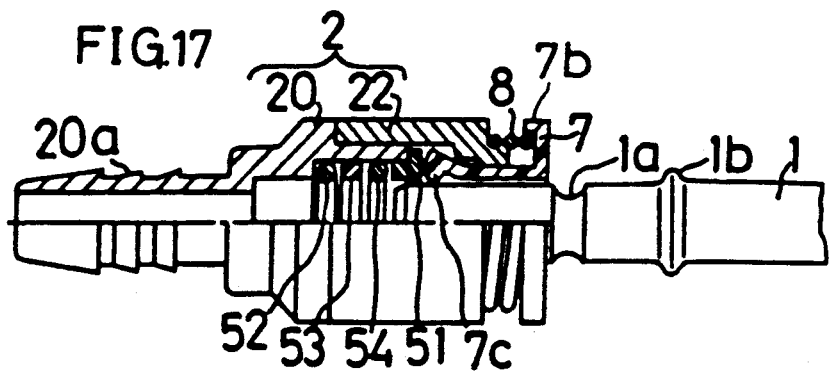

When carrying out piping by using the quick connector, the leading end of the male member 1 can be relatively inserted into the receiver opening 21i of the first socket 22 of the female member 2 in a manner similar to the quick connector of the First Preferred Embodiment. During the insertion, as illustrated in FIG. 17, the engager claw member 7 is moved inward as the male member 1 is inserted. In the course of the insertion, when the male member 1 is inserted insufficiently, the urging member 8 is reduced in an axial direction. Accordingly, the urging member 8 tells the assembly worker that the insertion is carried out insufficiently.

Figure 18:
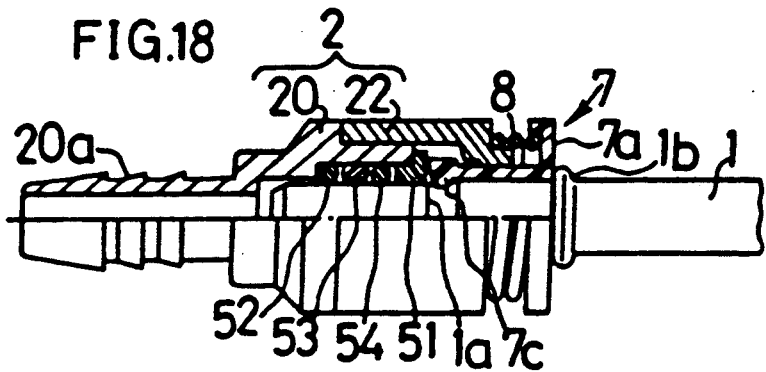
Figure 19:
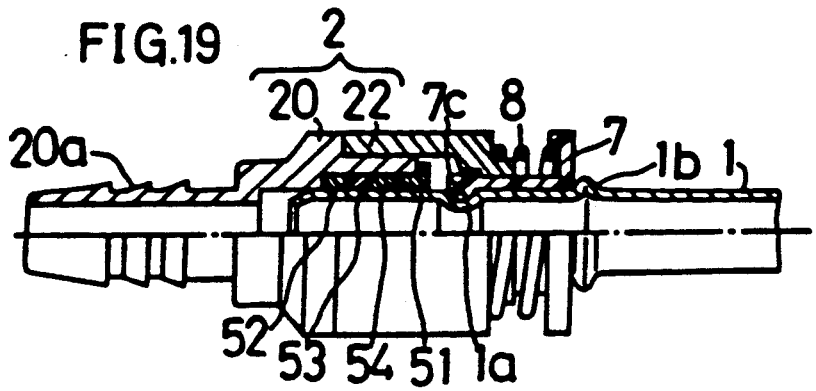
Figure 20:
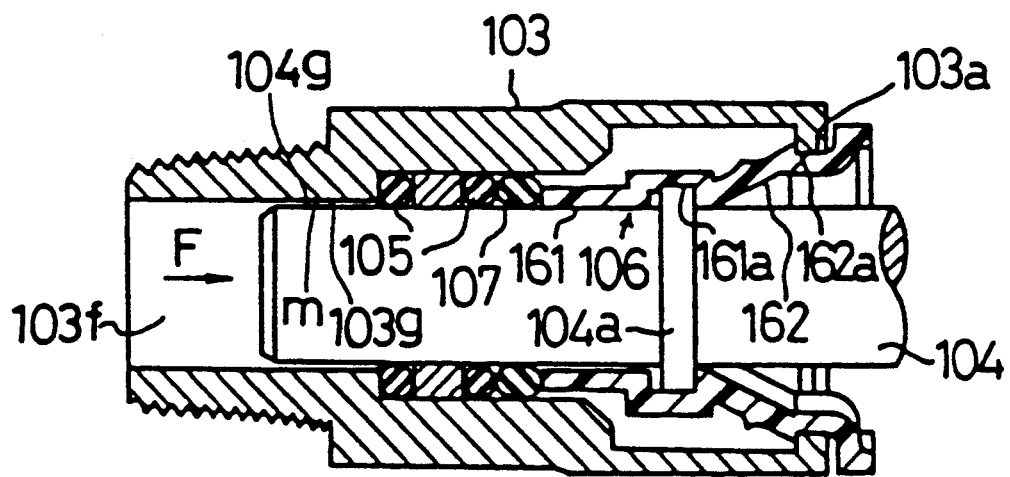
FIG. 20 is a fragmentary longitudinal cross sectional view of a conventional connector.

Thereafter, the male member 1 is further inserted into the receiver opening 21i of the first socket 22, and accordingly, as illustrated in FIG. 18, the engager claws 7c of the engager claw member 7 come to engage with the ring-shaped concave 1a of the male member 1. At this moment, since the ring-shaped projection 1b of the male member 1 is brought into contact with the rear surface of flange 7a of the engager claw member 3 simultaneously, no excessive insertion is carried out. When the assembly worker terminates the insertion under the circumstances, since the engager claws 7c of the engager claw member 7 are engaged with the ring-shaped concave 1a by the urging force of the urging member 8 as illustrated in FIG. 19 and since the ring-shaped projection 1b is brought into contact with the rear surface of flange 7a, the engager claw member 7 is moved outward to the receiver opening 21i of the first socket 22 together with the male member 1.

Through the quick connector thusly assembled in a piping system, a fluid is transferred by way of the tubular-shaped male member 1 and the tubular-shaped female member 2. The quick connector of the Third Preferred Embodiment operates and effects advantages similarly to the quick connector of the First Preferred Embodiment, and the operation and advantages will not be described herein accordingly.

Fourth Preferred Embodiment

The quick connector of the Fourth Preferred Embodiment according to the present invention will be hereinafter described with reference to FIGS. 21 through 29. FIGS. 21 through 24 illustrate connection processes of the quick connector. The quick connector comprises a male member 1, a female member 2, an engager claw member 3 and an urging member 4.

Figure 21:
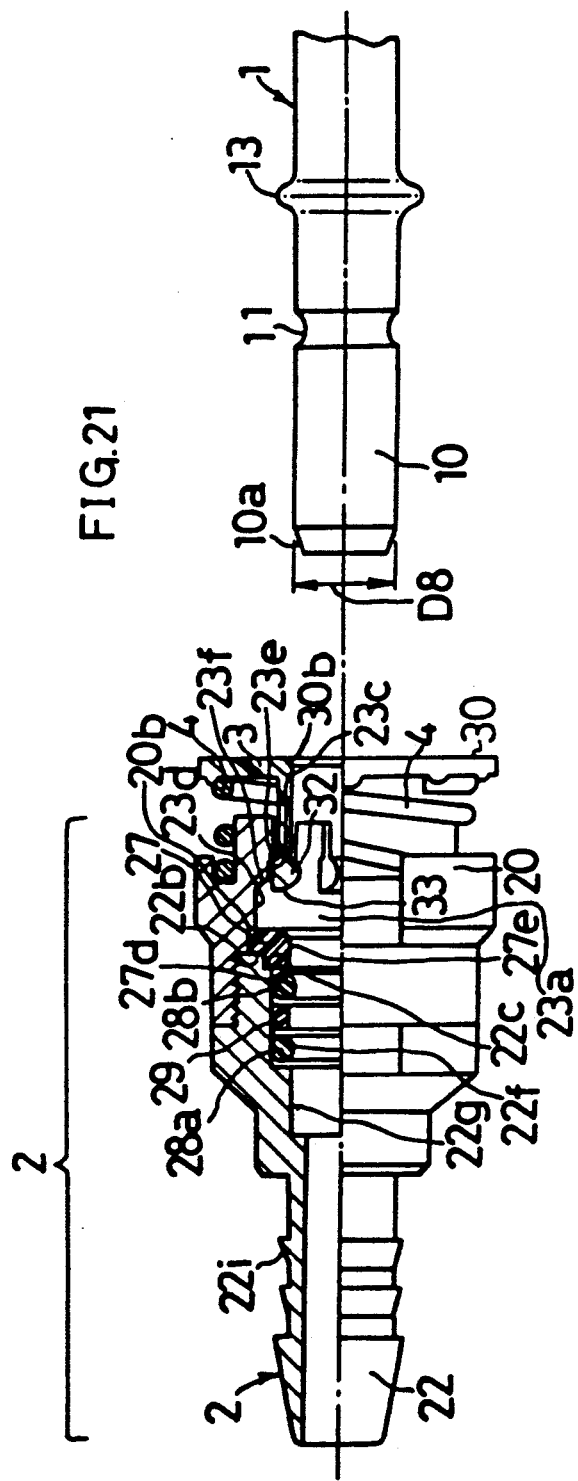

As illustrated in FIG. 21, the male member 1 includes an inserted end 10 made of a metal pipe, a ring-shaped concave 11 formed on an outer peripheral surface of an inserted end 10 thereof, and a ring-shaped projection 13 formed away from the ring-shaped concave 10 and adjacent to a rear end of the inserted end 10. Further, the male member 1 includes a guide surface 10a which is adapted for making the insertion thereof easier and which is formed at a leading end of the inserted end 10.

Figure 26:
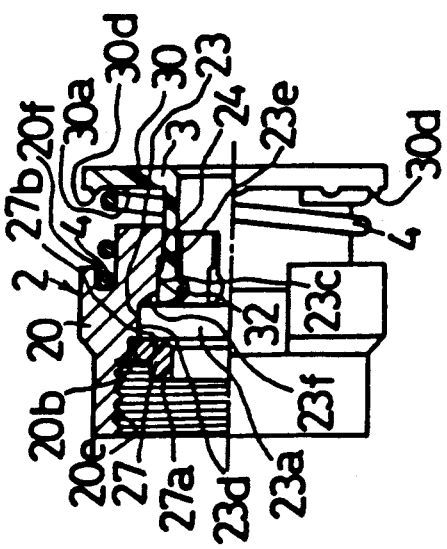
Figure 25:
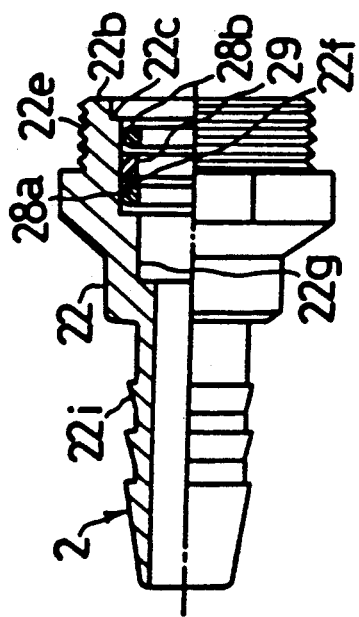

FIGS. 25 and 26 illustrate the female member 2. The female member 2 includes a tubular-shaped first socket 20 which have a female threaded portion 20e at a leading end thereof, and a tubular-shaped second socket 22 which have a male threaded portion 22e at a trailing end thereof, and a bushing 27 which works as a stopper. The first socket 20 and the second socket 22 are connected detachably by screwing the female threaded portion 20e and the male threaded portion 22e.

Figure 29:
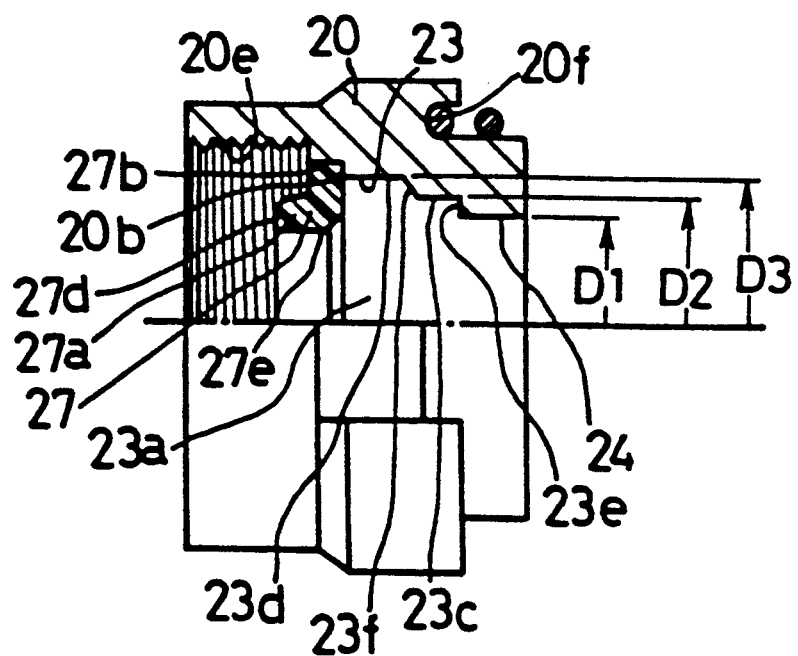

FIG. 29 illustrates the first socket 20 more in detail. The first socket 20 includes a receiver opening 24 which is formed in a circle at a trailing end thereof, and a ring-shaped first inner peripheral surface 23 which communicates with the receiver opening 24 and which defines a receiver hole 23a. The ring-shaped first inner peripheral surface 23 includes a inner peripheral surface 23c which has an inside diameter "D2" larger than an inside diameter "D1" of the receiver opening 24, a releaser inner peripheral surface 23d which has an inside diameter "D3" larger than the inside diameter "D2" of the inner peripheral surface 23c, a tapered surface 23f which increases a diameter thereof as it approaches the leading end of the first socket 20, and a stepped portion 23e. Further, the first socket 20 includes a ring-shaped seating groove 20f in an outer peripheral portion thereof, and a ring-shaped first holding surface 20b which is formed therein on an opposite side with respect to the receiver opening 24.

FIG. 25 illustrates the second socket 22. The second socket 22 includes ring-shaped second holding surfaces 22b, 22c, a sealing inner peripheral surface 22f, and a second inner peripheral surface 22g. The surfaces 22b, 22c, 22f and 22g are formed coaxially in this order starting from a trailing end thereof. The second holding surfaces 22b, 22c oppose the first holding surface 20b of the first socket 20. The inside diameter of the sealing inner peripheral surface 22f is set so that it is larger than the outside diameter of the inserted end 10 of the male member 1. The second inner peripheral surface 22g is adapted for surrounding the leading end of the inserted end 10. In a space which is defined by the sealing inner peripheral surface 22f, O-rings 28a, 28b and a ring-shaped collar 29 are disposed coaxially. The O-rings 28a, 28b are made of rubber, and work as the ring-shaped sealing member. The collar 29 is made of resin. Further, the second socket 22 includes a sawtooth-shaped sealing portion 22i which is formed on an outer peripheral surface at a leading end thereof.

FIG. 29 illustrates the bushing 27 which works as the stopper more in detail. The bushing 27 is made of resin, and includes a ring portion 27a and a flange portion 27b which extends radially outward. The ring portion 27a includes a central hole 27c which is adapted for disposing the inserted end 10 of the male member 1 therein. The leading end surface of the bushing 27 is a ring-shaped surface 27d. As can be seen best from FIG. 21, an outside diameter of the surface 27d of the bushing 27 is set larger than an inside diameter of the second inner peripheral surface 22f of the second socket 22. Since the surface 27d of the bushing 27 opposes the O-rings 28a, 28b, an inside diameter of the surface 27d, is set smaller than outside diameters of O-rings 28, 29.

Figure 28:
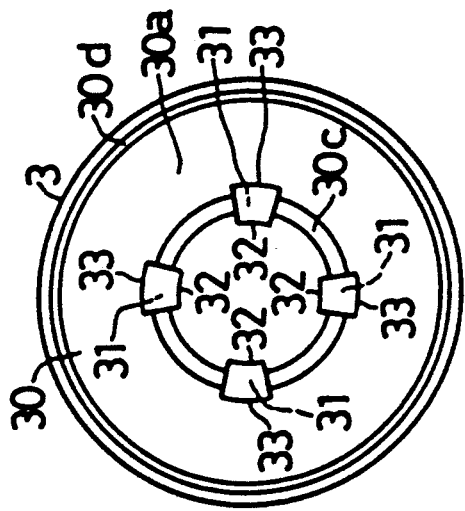
Figure 27:
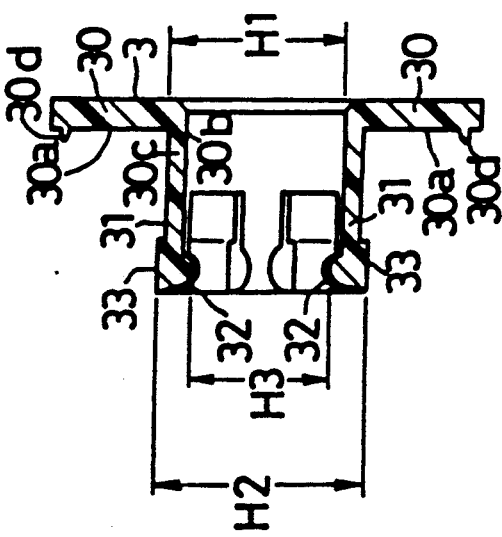

FIGS. 26 through 28 illustrate the engager claw member 3. The engager claw member 3 is made of resin, and includes a ring-shaped flange 30, arms 31, claws 32 and projections 33. The flange 30 extends in centrifugal directions, and includes a tube portion 30c which includes a central hole 30b, a spring seating surface 30a, and a ring-shaped seating projection 30d. The arms 31 extend from the tube portion 30c of the flange 30 in an axial direction. The claws 32 are disposed on free ends of the arms 31, and project radially inward. The projections 33 are formed integrally with the claws 32, and project radially outward.

In particular, the intervals "H1" between the outer surfaces of the arms 31 are set substantially equal to the inside diameter "D1" of the receiver opening 24 of the first socket 20. The intervals "H2" between the outer surfaces of the projections 33 are set substantially equal to the inside diameter "D2" of the inner peripheral surface 23c of the first socket 20, or it is set larger than the inside diameter "D1" and smaller than the inside diameter "D2." The intervals "H3" between the inner surfaces of the claws 32 are set smaller than an outside diameter "D8" of the inserted end 10.

As illustrated in FIG. 26, the urging member 4 is a metallic coil spring, and it is interposed between the seating groove 20f of the first socket 20 and the spring seating surface 30a of the flange 30. As illustrated in FIG. 21, before connecting the male member 1 and the female member 2, the urging member 4 urges the flange 30 of the engager claw member 3 in an axial direction of the first socket 20, thereby engaging the projections 33 of the engager claw member 3 with the stepped portion 23e of the first socket 20.

The usage of the quick connector of the Fourth Preferred Embodiment will be hereinafter described. Firstly, the assembly process of the female member 2 will be described in detail. While the O-rings 28a, 28b and the collar 29 are fastened on the sealing inner peripheral surface 22f of the second socket 22 of the female member 2, the first socket 20 and the second socket 22 are connected by screwing the female threaded portion 20e and the male threaded portion 22e. At this moment, as illustrated in FIG. 21, the bushing 27 is held between and fixed by the first holding surface 20b of the first socket 20 and the second holding surfaces 22b, 22c of the second socket 22. Under the above-described circumstances, the O-rings 28a, 28b and the collar 29 oppose the surface 27d of the bushing 27.

Figure 22:
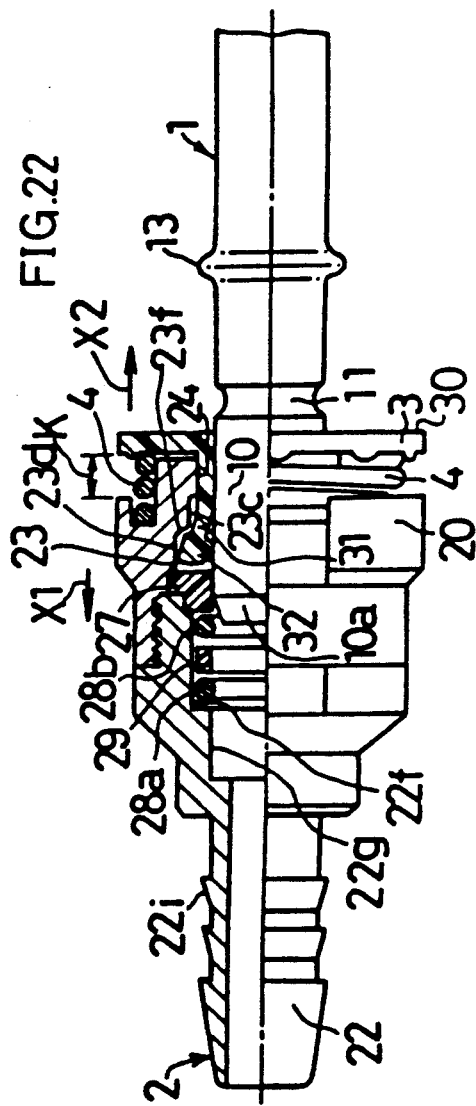
Figure 23:
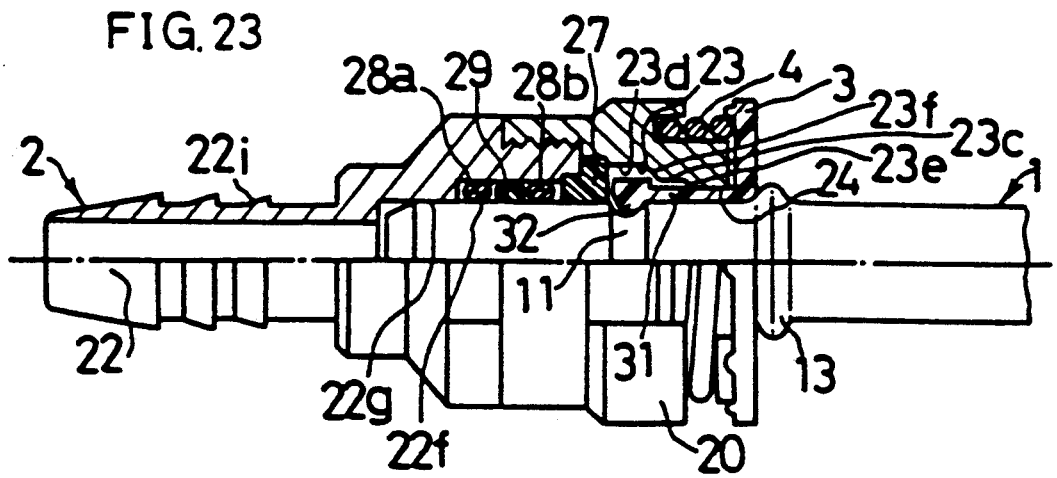
Figure 24:
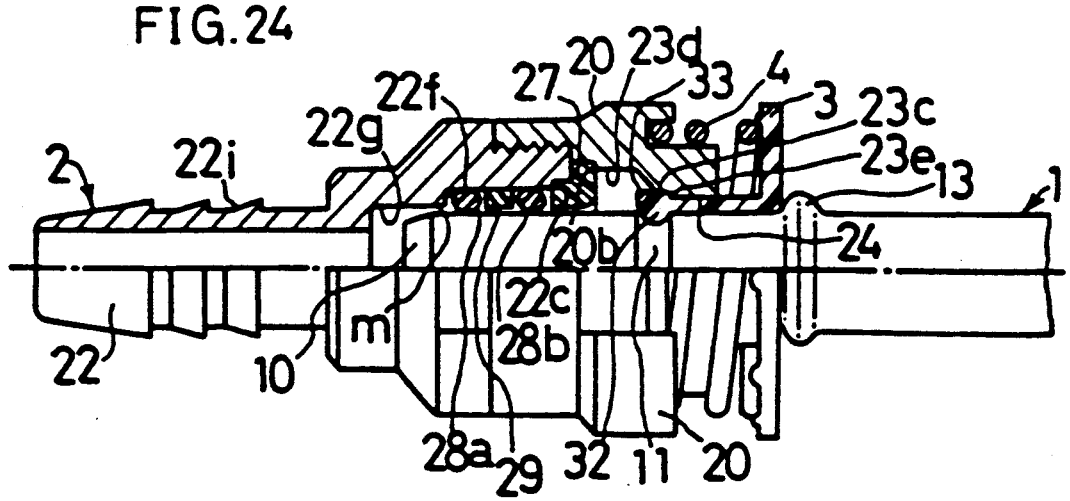

Secondly, the connection process of the female member 2 and the male member 1 will be described in detail. As illustrated in FIG. 21, the male member 1 and the female member 2 are opposed each other. Then, the engager claw member 3 is moved inward by finger tips or a jig, or the inserted end 10 is pressed forcibly in the receiver opening 24. With these operations, the inserted end 10 is inserted into the receiver hole 23a through the receiver opening 24 against the urging member 4. Here, an excessive insertion of the inserted end 10 can be inhibited by the ring-shaped projection 13 of the inserted end 10. As the inserted end 10 is inserted inward, the arms 31 of the engager claw member 3 are moved to the leading end of the second socket 22 as illustrated in FIG. 22, i.e., in the direction of the arrow "X1" of FIG. 22. At this moment, the claws 32 are bent radially outward by the outer peripheral surface of the inserted end 10. Accordingly, the claws 32 get away to the releaser inner peripheral surface 23d. When the insertion operation proceeds further and when the ring-shaped concave 11 reaches the claws 32 as illustrated in FIG. 23, the ring-shaped concave 11 engages with the claws 32. Consequently, the arms 31 and the claws 32 get back radially inward. Under the circumstances, since the spring force of the urging member 4 acts in an axial direction of the inserted end 10, the flange 30 of the engager claw member 3 is pressed in the axial direction. Hence, as illustrated in FIG. 24, the projections 33 of the engager claw member 3 are pressed onto the stepped portion 23e of the first socket 20, thereby inhibiting the regulatory projections 33 from moving in the axial direction. In addition, the projections 33 are inhibited from moving in a direction perpendicular to the axial direction by the inner peripheral surface 23c of the first socket 20. Since the projections 33 are inhibited from moving in the axial direction and in the direction perpendicular to the axial direction, the projections 33 as well as the engager claw member 3 do not come off from the first socket 20, and the ring-shaped concave 11 of the male member 1 engages with the claws 32 of the engager claw member 3 firmly.

When disconnecting the male member 1 and the female member 2, the flange 30 of the engager claw member 3 is pressed to the first socket 20. Then, the claws 32 of the engager claw member 3 are moved in the direction of the arrow "X1" of FIG. 22, and they are pressed radially outward. As a result, the claws 32 disengage from the ring-shaped concave 11 of the male member 1. While maintaining the disconnected state, the inserted end 10 of the male member 1 and the female member 2 are pulled apart each other in axial directions, and consequently the male member 1 and the female member 2 can be separated easily and quickly.

As having been described so far, in the quick connector of the Fourth Preferred Embodiment, the bushing 27 is held between and fixed by the first holding surface 20b of the first socket 20 and the second holding surfaces 22b, 22c of the second socket 22. Hence, the O-rings 28a, 28b are opposed to the surface 27d of the bushing 27, and accordingly the O-rings 28a, 28b are inhibited from excessively moving in an axial direction. Therefore, the construction is advantageous for enhancing the sealing property, the pressure resistance and the like.

Further, in the quick connector in which the O-rings 28a, 28b are inhibited from excessively moving in an axial direction, the urging member 4 and the engager claw member 3 are inhibited from being pressed by the O-rings 28a, 28b and the collar 29 even when the O-rings 28a, 28b and the collar 29 are subjected to a fluidic pressure which acts thereto by way of a fine space "m" between the second inner peripheral surface 22g and an outer peripheral surface of the inserted end 10 of the male member 1. This advantage can be understood from FIG. 24 which illustrates the quick connector during service. Accordingly, the engager claw member 3 is inhibited from being deformed by the fluidic pressure which is transmitted by way of the fine space "m." Therefore, the claws 32 engage with the ring-shaped concave 11 stably.

Furthermore, in the quick connector, since the male member 1 and the female member 2 can be separated by unfastening the female threaded portion 20e and the male threaded portion 22e, the O-rings 28a, 28b can be replaced with new ones easily when the O-rings 28a, 28b deteriorate.

Fifth Preferred Embodiment

Figure 30:
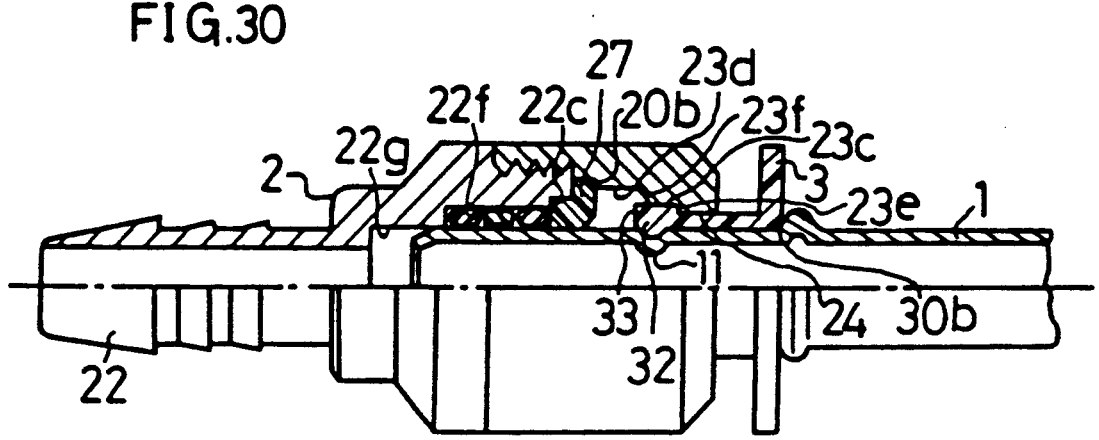
FIG. 30 relates to a quick connector of a Fifth Preferred Embodiment according to the present invention, and is a fragmentary longitudinal cross sectional view of the quick connector in which a male member and a female member is connected and whose upper half is illustrated in cross section.

The quick connector of the Fifth Preferred Embodiment according to the present invention will be hereinafter described with reference to FIG. 30. Since the quick connector of the Fifth Preferred Embodiment has an identical construction with that of the Fourth Preferred Embodiment basically, the same parts will be identified with the same reference numerals as those of the Fourth Preferred Embodiment.

However, the quick connector of the Fifth Preferred Embodiment is not provided with the urging member 4. In the quick connector, the female member 1 is inserted into the receiver opening 24 of female member 2 so as to engage the ring-shaped concave 11 with the claws 32. Under the circumstances, the male member 1 is pulled in an axial direction relatively so as to retract the engager claw member 3, thereby press-fitting the projection 33 into a hole which is defined by the inner peripheral surface 23c. Thus, the claws 32 are inhibited from moving in a direction perpendicular to an axial direction as well as in an axial direction by the inner peripheral surface 23c, and the male member 1 and the female member 2 are connected consequently.

Sixth Preferred Embodiment

The quick connector of the Sixth Preferred Embodiment according to the present invention will be hereinafter described with reference to FIGS. 31 and 32. Since the quick connector of the Sixth Preferred Embodiment has an identical construction with that of the Fourth Preferred Embodiment basically, the same parts will be identified with the same reference numerals as those of the Fourth Preferred Embodiment.

Figure 31:
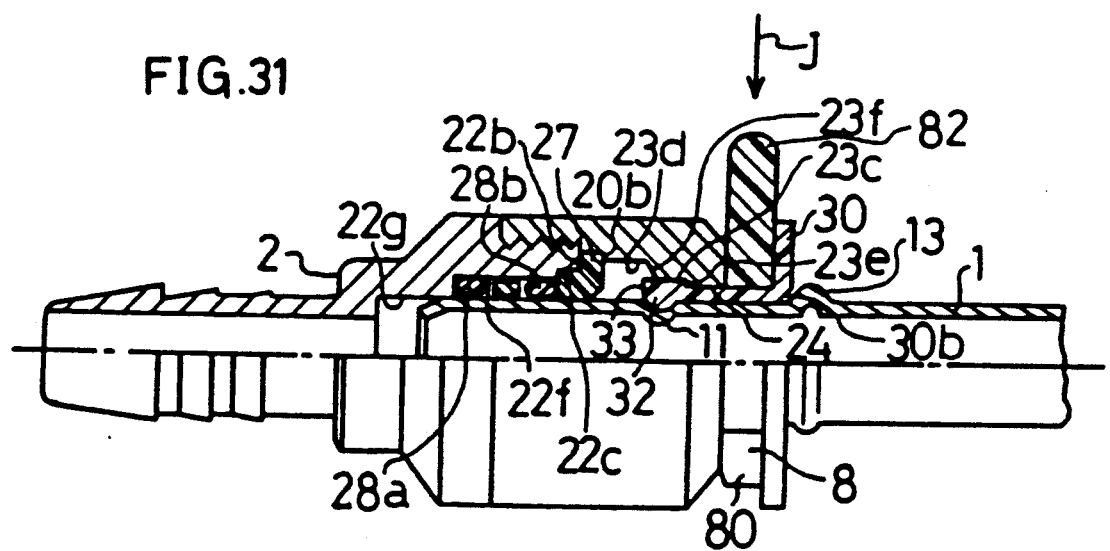
Figure 32:
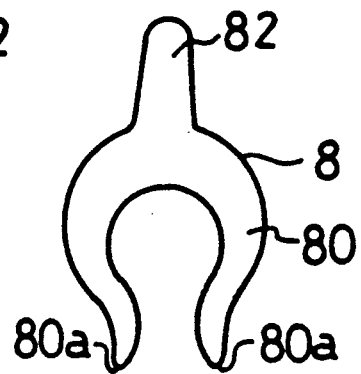

In the quick connector of the Sixth Preferred Embodiment, the male member 1 is pulled in an axial direction so as to firmly inhibit the claws 32 from moving in a direction perpendicular to an axial direction by the inner peripheral surface 23c, and thereafter a press-fitted member 8 which works as the urging member is press-fitted into a space between the flange 30 of the engager claw member 3 and the female member 2 in a direction of the arrow "J" of FIG. 31. With the construction, the engager claw member 3 is inhibited from displacing in an axial direction thereof, and the male member 1 and the female member 2 are connected consequently. As illustrated in FIG. 32, the press-fitted member 8 is made of nylon resin, and includes an inserted portion 80 which includes a guide portion 80a, and an operator knob 82 which is adapted for operating with finger tips or the like.

In the quick connectors of the Fifth and Sixth Preferred Embodiments, the bushing 27 is held between and fixed by the first holding surface 20b of the first socket 20 and the second holding surfaces 22b, 22c of the second socket 22 in the same manner as that of the Fourth Preferred Embodiment. Hence, the O-rings 28a, 28b are opposed to the surface 27d of the bushing 27, and accordingly the O-rings 28a, 28b are inhibited from excessively moving in an axial direction. Therefore, the construction is advantageous for enhancing the sealing property, the pressure resistance and the like.

Seventh Preferred Embodiment

Figure 33:
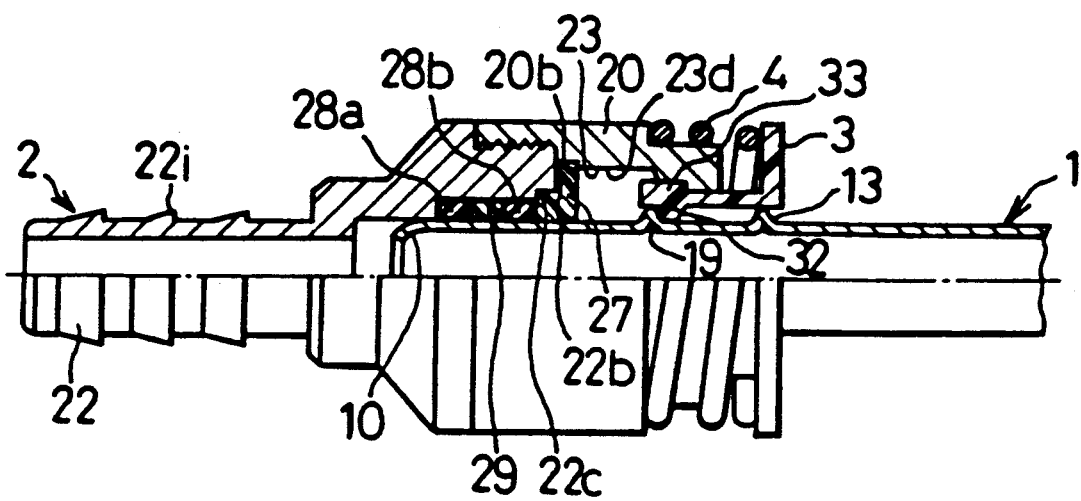
Figure 34:
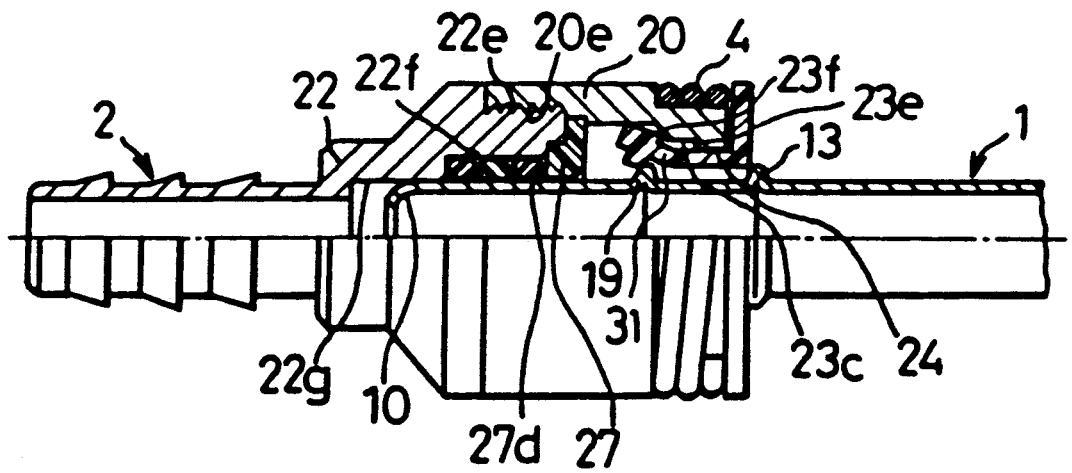

The quick connector of the Seventh Preferred Embodiment according to the present invention will be hereinafter described with reference to FIGS. 33 and 34. Since the quick connector of the Seventh Preferred Embodiment has an identical construction with that of the Fourth Preferred Embodiment basically, the same parts will be identified with the same reference numerals as those of the Fourth Preferred Embodiment.

However, in the quick connector of the Seventh Preferred Embodiment, the male member 1 is provided with a ring-shaped engager projection 19 on an outer peripheral surface thereof and a ring-shaped projection 13 in the rear of the ring-shaped engager projection 19. The ring-shaped engager projection 19 works as the engager, and engages with the claws 32 of the engager claw member 3.

Having now fully described the present invention, it will be apparent to one of ordinary skill in the art that many changes and modifications can be made thereto without departing from the spirit or scope of the present invention as set forth herein including the appended claims.

What is claimed is:

1. A quick connector, comprising:

a tubular-shaped male member including an engager formed at an end on an outer peripheral surface thereof, the engager extending therearound in a ring shape;

a tubular-shaped female member including a tubular-shaped socket disposed at an end thereof, said tubular-shaped socket including a receiver opening adapted for receiving said end of said male member therein, a ring-shaped inner peripheral surface formed inward with respect to the receiver opening and having an inside diameter which is larger than an outside diameter of said male member, and a ring-shaped releaser inner peripheral surface formed further inside with respect to the receiver opening and adjacent to the inner peripheral surface and having an inside diameter which is larger than the inside diameter of the inner peripheral surface;

an engager claw member held relatively movably in an axial direction with respect to said socket of said female member, said engager claw member including a flange opposing said receiver opening of said socket, said flange including a central hole which is adapted for disposing said end of said male member therein, an arm projecting from an inner peripheral surface of the flange in an axial direction, a free end of the arm extending to said inner peripheral surface of said socket, an engager claw disposed at the free end of said arm, projecting radially inward and adapted for engaging with said engager of said male member, and a projection projecting from the engager claw radially outward and adapted for engaging with said inner peripheral surface of said socket so as to inhibit the arm from disengaging from said socket in an axial direction and so as to inhibit the arm from deforming in a radial direction; and an urging member interposed between said socket of said female member and the flange of the engager claw member, and urging said engager claw member in a direction in which the engager claw member comes out of said receiver opening of said socket, thereby engaging said projection of said engager claw member with said inner peripheral surface of said socket while engaging said engager claw of said engager claw member with said engager of said male member, said socket of said female member further including a seating surface, said urging member being a coil spring which is interposed between said flange of said engager claw member and the seating surface of said socket in a compressed manner and which is disposed coaxially with said female member substantially, said flange of said engager claw member further including a ring-shaped projection which covers an outer peripheral surface of an end of the coil spring.

2. The quick connector according to claim 1, wherein said urging member is a press-fitted member which is to be press-fitted between said flange of said engager claw member and said female member.

3. The quick connector according to claim 1, wherein said male member further includes a ring-shaped projection which is disposed at a rear thereof with respect to said engager, which can contact with said flange of said engager claw member and which is adapted for controlling an insertion of said male member into said female member when the ring-shaped projection contacts with said flange.

4. The quick connector according to claim 1, wherein said engager of said male member is a ring-shaped concaved engager which is adapted for engaging with said engager claw of said engager claw member.

5. The quick connector according to claim 1, wherein said engager of said male member is a ring-shaped convexed engager which is adapted for engaging with said engager claw of said engager claw member.

6. The quick connector according to claim 1, wherein said male member further includes a truncated cone-shaped guide at a leading end thereof, the truncated cone-shaped guide which reduces an outside diameter thereof as it approaches the leading end thereof and which can contact with said engager claw of said engager claw member and lift up said engager claw radially outward as said male member is inserted.

7. A quick connector, comprising:

a tubular-shaped male member including a ring-shaped engager extending therearound, and an inserted end extending from the engager and disposed ahead of the engager;

a female member including a tubular-shaped first socket, the first socket including a receiver opening which is adapted for disposing said inserted end and said engager of said male member therein, a first inner peripheral surface which is adapted for surrounding said engager of said male member and a ring-shaped first holding surface which is disposed on an opposite side with respect to the receiver opening, a tubular-shaped second socket detachably connected to the first socket, the second socket including a ring-shaped second holding surface which is disposed on an end side of the second socket so as to oppose the first holding surface of the first socket, a ring-shaped sealing inner peripheral surface which is disposed adjacent to the second holding surface and coaxially therewith and which has an inside diameter larger than an outside diameter of said inserted end of said male member, a second inner peripheral surface which is adapted for surrounding a leading end of said inserted end of said male member, and a ring-shaped sealing member which is disposed coaxially with the sealing inner peripheral surface and which is adapted for sealing between an outer peripheral surface of said inserted end of said male member and the sealing inner peripheral surface, and a stopper held between the first holding surface of the first socket and the second holding surface of the second socket, the stopper including a central hole which is adapted for disposing said inserted end of said male member therein and a ring-shaped surface which opposes the ring-shaped sealing member and which is adapted for inhibiting the ring-shaped sealing member from displacing in an axial direction;

an engager claw member including a flange, the flange extending in a centrifugal direction, opposing said receiver opening of said first socket of said female member and including a central hole which is adapted for disposing said inserted end and said engager of said male member therein, an arm extending from the flange in an axial direction and inserted into said receiver opening of said first socket, and a claw disposed at a free end of the arm and adapted for engaging with said engager of said male member, and a projection adapted for inhibiting the engager claw member itself from disengaging from said first socket in an axial direction; and an urging member engaging said first socket of said female member and said flange of said engager claw member and adapted for biasing said claw of said engager claw member in a direction so as to engage said claw with said engager of said male member and for biasing said projection of said engager claw member in a direction so as to engage said projection with said first inner peripheral surface of said first socket.

8. The quick connector according to claim 7, wherein said stopper of said female member includes a ring-shaped flange portion which is held between said first holding surface of said first socket of said female member and said second holding surface of said second socket of said female member, and a ring portion which is disposed integrally with and radially inward with respect to the flange portion and which includes a surface disposed substantially coaxially with said female member.

9. The quick connector according to claim 7, wherein said ring-shaped sealing member is an O-ring.

10. The quick connector according to claim 7, wherein said first socket of said female member further includes a threaded portion on either of an inner periphery or an outer periphery thereof, and said second socket of said female member further includes a threaded portion on either of an inner periphery surface or an outer periphery surface thereof so as to fasten with the threaded portion of said first socket.

11. The quick connector according to claim 7, wherein said first socket of said female member further includes a seating groove, said urging member is a coil spring which is interposed between said flange of said engager claw member and the seating groove of said first socket in a compressed manner and which is disposed coaxially with said female member substantially, and said flange of said engager claw member further includes a ring-shaped projection which covers an outer peripheral surface of an end of the coil spring.

12. The quick connector according to claim 7, wherein said first socket of said female member further includes a truncated cone-shaped tapered surface which reduces an outside diameter thereof as it approaches an end of said receiver opening, and said urging member includes a letter "C"-shaped ring spring which exerts a spring force in a radial direction and a plurality of fasteners which are disposed in a circumferential direction of the ring spring, which reduce inside diameters thereof as they approach said female member and which include tapered surfaces agreeing with the truncated cone-shaped tapered surface of said first socket.

13. The quick connector according to claim 7, wherein said urging member is a press-fitted member which is to be press-fitted between said flange of said engager claw member and said female member.

14. The quick connector according to claim 13, wherein said press-fitted member includes a substantially letter "C"-shaped inserted portion, and an operator knob which extends from the inserted portion integrally therewith and which is adapted for operating with finger tips.

15. The quick connector according to claim 7, wherein said male member further includes a ring-shaped projection which is disposed at a rear thereof with respect to said engager, which can contact with said flange of said engager claw member and which is adapted for controlling an insertion of said male member into said female member when the ring-shaped projection contacts with said flange.

16. The quick connector according to claim 7, wherein said engager of said male member is a ring-shaped concaved engager which is adapted for engaging with said engager claw of said engager claw member.

17. The quick connector according to claim 7, wherein said engager of said male member is a ring-shaped convexed engager which is adapted for engaging with said engager claw of said engager claw member.

18. The quick connector according to claim 7, wherein said male member further includes a truncated cone-shaped guide at said leading end thereof, the truncated cone-shaped guide which reduces an outside diameter thereof as it approaches to said leading end thereof and which can contact with said engager claw of said engager claw member and lift up said engager claw radially outward as said male member is inserted.

19. A quick connector, comprising:
a tubular-shaped male member including a ring-shaped engager extending therearound, and an inserted end extending from the engager and disposed ahead of the engager;
a female member including a tubular-shaped first socket, the first socket including a receiver opening which is adapted for disposing said inserted end and said engager of said male member therein, a first inner peripheral surface which is adapted for surrounding said engager of said male member and a ring-shaped first holding surface which is disposed on an opposite surface with respect to the receiver opening, a tubular-shaped second socket detachably connected to the first socket, the second socket including a ring-shaped second holding surface which is disposed on an end side of the second socket so as to oppose the first holding surface of the first socket, a ring-shaped sealing inner peripheral surface which is disposed adjacent to the second holding surface and coaxially therewith and which has an inside diameter larger than an outside diameter of said inserted end of said male member, a second inner peripheral surface which is adapted for surrounding a leading end of said inserted end of said male member, and a ring-shaped sealing member which is disposed coaxially with the sealing inner peripheral surface and which is adapted for sealing between an outer peripheral surface of said inserted end of said male member and the sealing inner peripheral surface, and a stopper held between the first holding surface of the first socket and the second holding surface of the second socket, the stopper including a central hole which is adapted for disposing said inserted end of said male member therein and a ring-shaped surface which opposes the ring-shaped sealing member and which is adapted for inhibiting the ring-shaped sealing member from displacing in an axial direction; and an engager claw member separate from the stopper and including a flange, the flange extending in a centrifugal direction, opposing said receiver opening of said first socket of said female member and including a central hole which is adapted for disposing said inserted end and said engager of said male member therein, an arm extending from the flange in an axial direction and inserted into said receiver opening of said first socket, and a claw disposed at a free end of the arm and adapted for engaging with said engager of said male member, and a projection which is capable of engaging with said first inner peripheral surface of said first socket so as to inhibit the engager claw member itself from disengaging from said first socket of said female member in an axial direction.

20. The quick connector according to claim 19, wherein said stopper of said female member includes a ring-shaped flange portion which is held between said first holding surface of said first socket of said female member and said second holding surface of said second socket of said female member, and a ring portion which is disposed integrally with and radially inward with respect to the flange portion and which includes a surface disposed substantially coaxially with said female member.

21. The quick connector according to claim 19, wherein said ring-shaped sealing member is an O-ring.

22. The quick connector according to claim 19, wherein said first socket of said female member further includes a threaded portion on either of an inner periphery or an outer periphery thereof, and said second socket of said female member further includes a threaded portion on either of an inner periphery surface or an outer periphery surface thereof so as to fasten with the threaded portion of said first socket.

23. The quick connector according to claim 19, wherein said male member further includes a ring-shaped projection which is disposed at a rear thereof with respect to said engager, which can contact with said flange of said engager claw member and which is adapted for controlling an insertion of said male member into said female member when the ring-shaped projection contacts with said flange.

24. The quick connector according to claim 19, wherein said engager of said male member is a ring-shaped concaved engager which is adapted for engaging with said engager claw of said engager claw member.

25. The quick connector according to claim 19, wherein said engager of said male member is a ring-shaped convexed engager which is adapted for engaging with said engager claw of said engager claw member.

26. The quick connector according to claim 19, wherein said male member further includes a truncated cone-shaped guide at said leading end thereof, the truncated cone-shaped guide which reduces an outside diameter thereof as it approaches to said leading end thereof and which can contact with said engager claw of said engager claw member and lift up said engager claw radially outward as said male member is inserted.

27. A quick connector, comprising:
a tubular-shaped male member including a ring-shaped engager extending therearound, and an inserted end extending from the engager and disposed ahead of the engager;
a female member including a tubular-shaped first socket, the first socket including a receiver opening which is adapted for disposing said inserted end and said engager of said male member therein, a first inner peripheral surface which is adapted for surrounding said engager of said male member and a ring-shaped first holding surface which is disposed on an opposite side with respect to the receiver opening, a tubular-shaped second socket detachably connected to the first socket, the second socket including a ring-shaped second holding surface which is disposed on an end side of the second socket so as to oppose the first holding surface of the first socket, a ring-shaped sealing inner peripheral surface which is disposed adjacent to the second holding surface and coaxially therewith and which has an inside diameter larger than an outside diameter of said inserted end of said male member, a second inner peripheral surface which is adapted for surrounding a leading end of said inserted end of said male member, and a ring-shaped sealing member which is disposed coaxially with the sealing inner peripheral surface and which is adapted for sealing between an outer peripheral surface of said inserted end of said male member and the sealing inner peripheral surface, and a stopper held between the first holding surface of the first socket and the second holding surface of the second socket, the stopper including a central hole which is adapted for disposing said inserted end of said male member therein and a ring-shaped surface which opposes the ring-shaped sealing member and which is adapted for inhibiting the ring-shaped sealing member from displacing in an axial direction;
an engager claw member including a flange, the flange extending in a centrifugal direction, opposing said receiver opening of said first socket of said female member and including a central hole which is adapted for disposing said inserted end and said engager of said male member therein, an arm extending from the flange in an axial direction and inserted into said receiver opening of said first socket, and a claw disposed at a free end of the arm and adapted for engaging with said engager of said male member, and a projection adapted for inhibiting the engager claw member itself from disengaging from said first socket in an axial direction; and
an urging member disposed between said first socket of said female member and said flange of said engager claw member and adapted for urging said claw of said engager claw member in a direction so as to engage said claw with said engager of said male member and for urging said projection of said engager claw member in a direction so as to engage said projection with said first inner peripheral surface of said first socket,
said first socket of said female member further including a seating groove,
said urging member being a coil spring which is interposed between said flange of said engager claw member and the seating groove of said first socket in a compressed manner and which is disposed coaxially with said female member substantially,
said flange of said engager claw member further including a ring-shaped projection which covers an outer peripheral surface of an end of the coil spring.

28. The quick connector according to claim 27, wherein said stopper of said female member includes a ring-shaped flange portion which is held between said first holding surface of said first socket of said female member and said second holding surface of said second socket of said female member, and a ring portion which is disposed integrally with and radially inward with respect to the flange portion and which includes a surface disposed substantially coaxially with said female member.

29. The quick connector according to claim 27, wherein said ring-shaped sealing member is an O-ring.

30. The quick connector according to claim 27, wherein said first socket of said female member further includes a threaded portion on either of an inner periphery or an outer periphery thereof, and said second socket of said female member further includes a threaded portion on either of an inner periphery surface or an outer periphery surface thereof so as to fasten with the threaded portion of said first socket.

31. The quick connector according to claim 27, wherein said male member further includes a ring-shaped projection which is disposed at a rear thereof with respect to said engager, which can contact with said flange of said engager claw member and which is adapted for controlling an insertion of said male member into said female member when the ring-shaped projection contacts with said flange.

32. The quick connector according to claim 27, wherein said engager of said male member is a ring-shaped concaved engager which is adapted for engaging with said engager claw of said engager claw member.

33. The quick connector according to claim 27, wherein said engager of said male member is a ring-shaped convexed engager which is adapted for engaging with said engager claw of said engager claw member.

34. The quick connector according to claim 27, wherein said male member further includes a truncated cone-shaped guide at said leading end thereof, the truncated cone-shaped guide which reduces an outside diameter thereof as it approaches to said leading end thereof and which can contact with said engager claw of said engager claw member and lift up said engager claw radially outward as said male member is inserted.

* * * * *